United States Patent
Iversen

[11] 3,759,625
[45] Sept. 18, 1973

[54] CUTTING TOOL
[76] Inventor: Norman H. Iversen, P. O. Box 178, Lathrup Village, Mich. 48012
[22] Filed: Sept. 15, 1970
[21] Appl. No.: 72,379

[52] U.S. Cl................. 408/188, 29/105, 29/105 A, 29/106, 408/59, 408/200, 408/227, 408/229
[51] Int. Cl..... B23d 1/28, B23d 77/02, B23d 77/06
[58] Field of Search.................... 408/114, 188, 200, 408/227, 228, 229, 231, 232, 233, 713, 81, 83, 59; 29/105, 105.1, 106

[56] References Cited
UNITED STATES PATENTS
1,514,704  11/1924  Jack.................................... 408/229
2,391,794  12/1945  O'Brien................................ 408/57
852,274  4/1907  Johnston............................ 408/232
906,656  12/1908  Peck.................................... 408/233
960,526  6/1910  Erlandsen........................... 29/106

Primary Examiner—Francis S. Husar
Attorney—Barnes, Kisselle, Raisch and Choate

[57] ABSTRACT

A cutting tool such as a reamer or a boring tool having a plurality of cutting edges for machining the inner cylindrical surface of a hole and also having a plurality of guide edges or surfaces trailing and spaced circumferentially from the cutting edges and adapted to engage the cylindrical surface machined by the cutting edges to stabilize the tool radially without interferring with the cutting action of the cutting edges.

9 Claims, 14 Drawing Figures

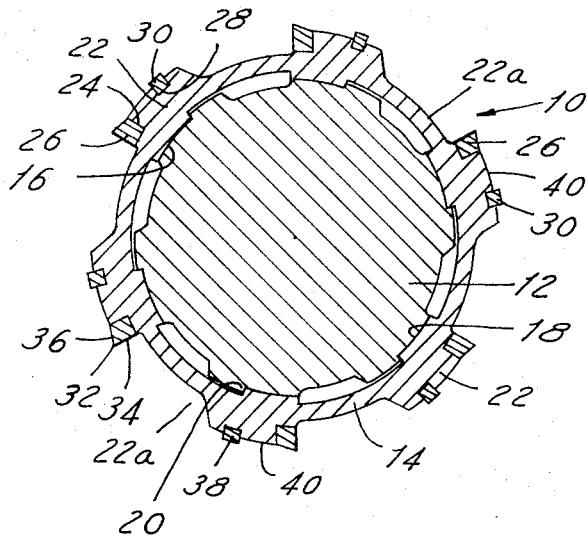
FIG.1
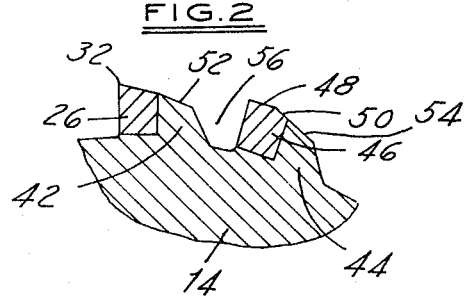
FIG.2
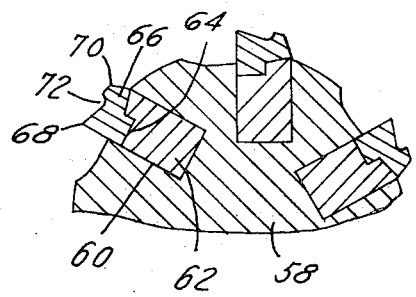
FIG.3
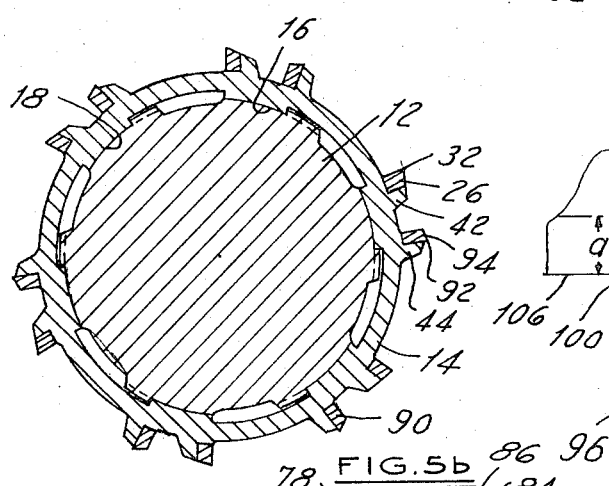
FIG.4 / FIG.5a / FIG.5b
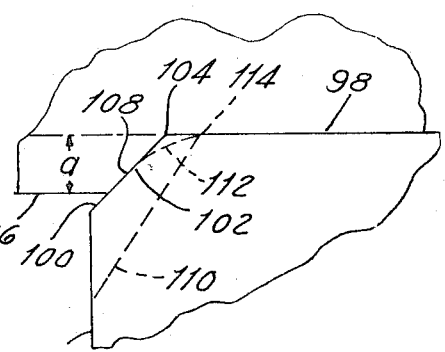
FIG.6
INVENTOR
Norman H. Iverson
BY
Barnes, Kisselle, Raisch & Choate
ATTORNEYS PATENTED SEP 18 1973 3,759,625
SHEET 2 OF 2
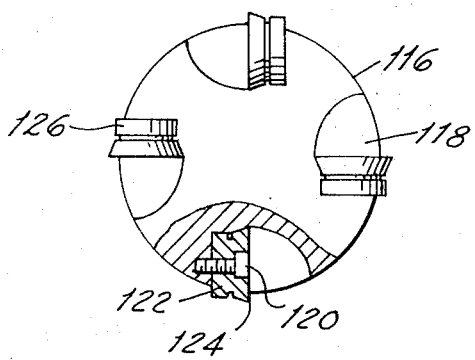
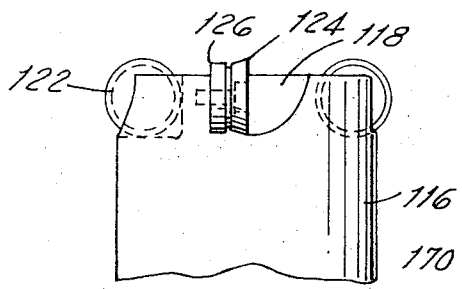
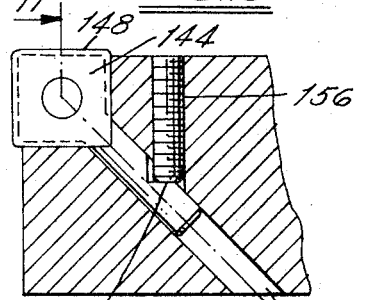
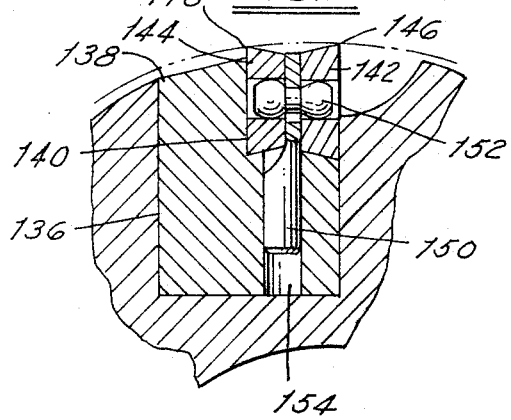
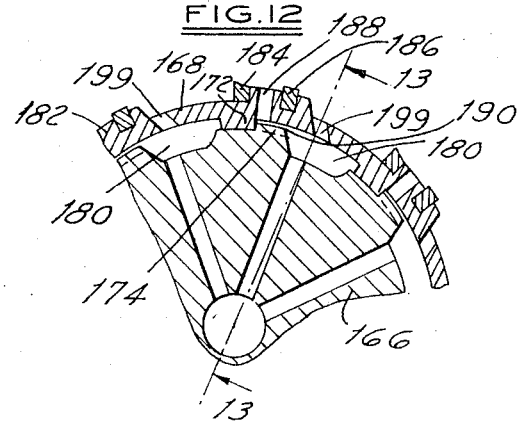
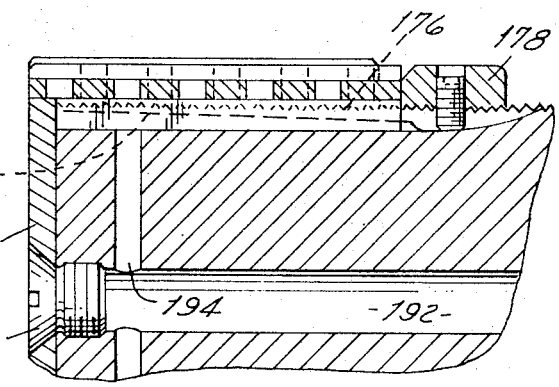
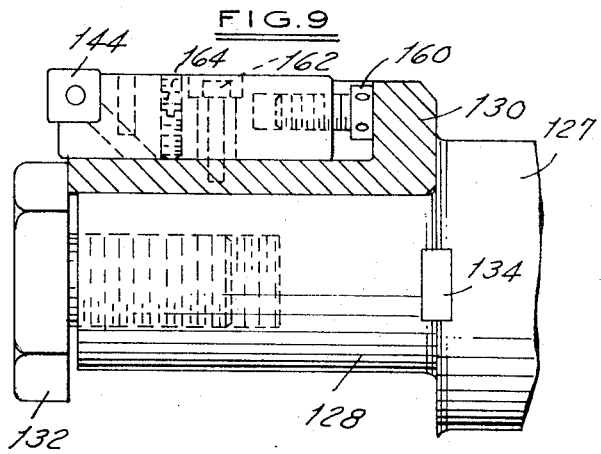
INVENTOR
Norman H. Iverson
BY
Barnes, Kisselle, Raisch & Choate
ATTORNEYS

CUTTING TOOL

This invention relates to a rotary cutting tool and, more specifically, to a multi-blade or multi-tooth tool such as a reamer or a boring tool which is rotated about a fixed axis and advanced axially for machining the inner cylindrical surface of a hole in a metal workpiece.

Reamers and multiple bladed boring tools have a tendency to chatter unless some means are provided for radially stabilizing the tool in the hole being machined. Normally the means employed for guiding the tool consist of cylindrical lands of various widths which are formed integrally with and directly adjacent the longitudinally extending edges of the ribs between successive flutes of the tool. More specifically, these longitudinally extending edges, which are incapable of cutting, are defined by the line of intersection between a front rake face and a cylindrical land. Obviously such tools must be provided with radially extending cutting edges at the leading end thereof in order to remove metal from the side wall of the hole being machined. These radially extending cutting edges intersect the ends of the longitudinally extending guide edges, the points of intersection lying on a circle which corresponds in diameter to the diameter of the hole being machined. When the cutting and guide edges become worn at their zones of intersection, the cylindrical lands at the leading end of the tool create interference with the wall of the hole being machined. Thus as the cutting edges at the leading end of the tool wear the lands become subjected to tremendous radial stresses which result in rapid wear as well as chipping and breaking of the cutting edges, particularly where the cutting edges are formed on carbide inserts. This interference also results in galling and the production of undersized holes.

The present invention has for its object the elimination of the problems referred to above by providing a multi-blade cutting tool having cutting edges and guide surfaces so arranged as to eliminate chattering while at the same time prolonging the life of the tool and enabling machining of accurately sized and axially true holes.

More specifically, the present invention contemplates a cutting tool such as a reamer or a multi-bladed boring tool having guide surfaces or edges located adjacent but spaced from and circumferentially behind longitudinally extending cutting edges. Each longitudinally extending cutting edge is defined by a sharp edge formed by the line of intersection between a front rake face and a radially outer clearance face which is backed off completely or at least substantially completely to the cutting edge. The clearance face is preferably flat but may be a curved surface backed off in an arcuate manner. At the leading end of the tool the guide surfaces terminate closely adjacent but slightly axially inwardly of the radially extending cutting edges. With the guide surfaces so arranged, when the cutting edges at the leading end of the tool wear, the guide surfaces present substantially no interference because the circumferential spacing between the cutting edges and the guide surfaces enables flexing to occur in either the workpiece or the tool in those segments thereof extending circumferentially between the cutting edges and the guide surfaces. At the same time as the cutting edges at the leading end of the tool wear the portion of the longitudinally extending cutting edges adjacent the worn portions are still capable of performing a cutting action, thus producing a hole of true size and substantially prolonging the life of the tool.

In the drawings:

FIG. 1 is a sectional view of one form of reamer according to the present invention, the reamer being of the shell type.

FIG. 2 shows a slightly different arrangement of cutting and guiding edges.

FIG. 3 is a sectional view of another form of reamer according to the present invention.

FIG. 4 is a sectional view of a shell type reamer with cutting and guiding edges arranged generally in the manner illustrated in FIG. 2.

FIG. 5a shows on an enlarged scale the blade insert illustrated in FIG. 3.

FIG. 5b shows a slightly modified form of guide insert.

FIG. 6 is a somewhat schematic view showing the manner in which the cutting tool of the present invention functions.

FIG. 7 is an end view partly in section of a boring tool embodying the present invention.

FIG. 8 is a fragmentary side elevational view of the boring tool shown in FIG. 7.

FIG. 9 is a sectional view of a modified form of boring tool embodying the present invention.

FIG. 10 is a fragmentary sectional view on an enlarged scale of a portion of the tool shown in FIG. 9.

FIG. 11 is a sectional view along line 11—11 in FIG. 10.

FIG. 12 is a fragmentary sectional view of another form of shell type reamer embodying the present invention.

FIG. 13 is a sectional view taken along the line 13—13 in FIG. 12.

Referring to FIG. 1, there is illustrated a reamer generally designated 10 which includes an arbor 12 on which a shell 14 is telescopically arranged. Arbor 12 has a plurality of regularly spaced pads or seats 16 around its outer periphery which taper axially of the arbor. Seats 16 register radially with tapered splines 18 around the inner periphery of shell 14. Adjacent each tapered seat 16 arbor 12 is formed with a radially outwardly extending shoulder 20 which provides a positive rotary driving connection with the tapered splines 18 on the shell. Shell 14 is adapted to be expanded when shifted axially in one direction relative to the arbor.

Around its outer periphery shell 14 is formed with a plurality of circumferentially spaced ribs 22 and flutes 22a therebetween. Ribs 22 are generally radially aligned with the inner splines 18. Each rib 22 is fashioned with a socket or seat 24 which extends axially of the tool and in which a carbide insert 26 is secured by brazing, or other bonding means. A second socket or seat 28 is formed in each rib 22 spaced circumferentially behind insert 26 in relation to the direction of rotation of the tool. Within seat 28 there is brazed or otherwise secured a second insert 30. Insert 26 has a cutting edge 32 which is defined by the line of intersection of a front rake face 34 and a radially outer clearance face 36. Clearance face 36 is backed off completely to or at least substantially completely to the cutting edge 32 so that the cutting edge is defined by the intersection of two generally flat planes which are angularly related to define an acute angle therebetween. Clearance face 36 forms with front rake face 34 an acute angle which is smaller than the angle formed with front rake face 34 by a tangent at the cutting edge 32. In this respect the reamer of this invention differs from conventional reamers where each cutting edge is defined by a front rake face and cylindrical land. It will be noted that insert 26 on which cutting edge 32 is formed is solidly supported in a radial direction by the interengaging mating tapered surfaces of splines 18 and seats 16.

Insert 30 has an outer face 38 which in the particular embodiment illustrated in FIG. 1 comprises a cylindrical surface circle ground to the same diameter as cutting edge 32. Insert 30 is substantially completely supported in a radial direction by the interengaged tapered surfaces of splines 18 and seats 16. In the arrangement illustrated in FIG. 1 inserts 30 (the outer surfaces 38 of which provide guide surfaces) are spaced circumferentially behind cutting edges 32 about 15° to 18°. The guide surface 38 of each insert 30 and the cutting edge 32 of each insert 26 are spaced radially outwardly beyond the radially outer face of rib 22 so as to define a longitudinally extending recess 40 between each cutting edge and its respective guide member.

In FIG. 2 insert 26 on which the cutting edge 32 is formed is the same as insert 26 shown in FIG. 1. However, the shell 14 is formed with circumferentially spaced ribs 42 and 44 to which inserts 26 and 46 are secured. Guide insert 46 is ground with a cylindrical outer surface 48 which is backed off as at 50 on the trailing side thereof. The trailing sides of each of ribs 42,44 are also backed off to form secondary clearance faces as indicated at 52 and 54, respectively. The space between insert 26 and insert 46 provides a groove 56 which is deeper than groove 40 shown in FIG. 1. In other respects the reamer shown in FIG. 2 is substantially the same as that shown in FIG. 1.

In FIG. 3 there is illustrated a reamer of the blade type, as distinguished from the shell type, which includes an arbor 58 having a plurality of axially extending, circumferentially spaced, rectangular slots 60 therein in which blade members 62 are secured. The radially outer end of each blade 62 has a stepped configuration as indicated at 64 on which a carbide insert 66 is bonded. Each insert 66 is fashioned with a cutting edge 68 at the front side thereof and a guide surface 70 at the trailing side thereof. The cutting edge 68 and guide surface 70 on each insert are separated by an axially extending groove or recess 72. Insert 66 is shown on an enlarged scale in FIG. 5a. It will be noted that cutting edge 68 is defined by the line of intersection between a front rake face 74 and a primary clearance or back off face 76. The secondary clearance or back off face 78 merges into groove 72. The trailing side of groove 72 is defined by a face 80 having a negative rake angle with the cylindrical land 70 which defines the guiding surface.

The carbide insert shown in FIG. 5b and generally designated 82 is substantially the same as insert 66 with respect to the cutting edge 68, the front rake face 74 and the primary and secondary clearance faces 76 and 78, respectively. However, in the case of insert 82 the guide surface is in the form of a sharp edge 84 defined by a front face 86 having a negative rake angle and a trailing face 88. In each of the embodiments illustrated the guide surfaces or guide edges have a diameter corresponding to the diameter of the cutting edges or, if desired, a diameter only slightly greater than the cutting edges. Inserts 62 and 82 are not restricted for use on a blade or solid type reamer; they may also be used on shell type reamers.

The reamer illustrated in FIG. 4 is a shell type reamer generally of the type shown in FIG. 1 including a central arbor 12 and an outer shell 14. Shell 14 has a plurality of pairs of circumferentially spaced ribs 42,44 as in the embodiment illustrated in FIG. 2. Each of these ribs is adapted to have an insert secured or bonded thereto. The forward insert of each pair, which is designated 26, is the same as insert 26 shown in FIGS. 1 and 2 and is provided with a cutting edge 32. The trailing insert, which is designated 90, provides the guide member, the guiding edge 92 thereof being defined in part by a radially outer face 94 which is inclined in a direction radially inwardly and forwardly.

In FIG. 6 there is shown in a somewhat schematic manner the leading end of a reamer constructed in accordance with the present invention. The leading end face of the reamer is designated 96 and the cylindrical surface machined by the axially extending cutting edges (edges 32 in the case of the reamers shown in FIGS. 1, 2 and 4 and edges 68 in the case of the reamers shown in FIGS. 3, 5a and 5b) is designated 98. The leading end of the reamer is chamfered around its outer periphery as indicated at 100, the chamfered portion being fashioned with radially extending cutting edges 102 which at their radially outer ends intersect the axially extending cutting edges which machine the surface 98. The points of intersection of these radially and axially extending cutting edges is designated 104. As the reamer is advanced into the hole 106 in the workpiece the radially inclined cutting edges 102 machine away the portion of the side wall of the hole designated a.

Since the reamer is fed axially into the work as it or the workpiece or both are rotated, it is apparent that each of the radially cutting edges 102 traverse a generally helical path relative to the workpiece. Since the guide surfaces on the guide inserts are spaced circumferentially behind the cutting edges, it is important that the guide inserts at their leading end terminate closely adjacent the cutting edges 102 but, nevertheless, are spaced axially inwardly of the radial cutting faces 102 so as to avoid obstruction with the surface 108 machined by the preceding cutting edge 102. In the schematic showing of FIG. 6 the leading end of each guide insert is shown in broken lines as a chamfered end 110. The axial distance between the cutting edges 102 and the ends 110 of the guide inserts may vary depending upon the rate of feed of the reamer and the angular spacing between each cutting edge and its associated guide member. It is desirable to have the lead ends of the guide inserts terminate as close as possible to the radial cutting edges 102 without interferring with the cutting action. However, after prolonged use the cutting edges 102 and those machining the cylindrical wall 98 will gradually wear to the configuration shown in broken lines at 112. The ends 110 of the guide inserts will present no obstruction until the worn surfaces 112 axially approach the radial plane of the points 114 where the radially outer ends of the guide inserts intersect the cylindrical surface generated by the axially extending cutting edges on the reamer. With most reamers of this invention an axial clearance of about 0.005 to 0.010 inch between the circles defined by points 104 and 114 produces satisfactory results and enables the reamer to be used over an extended period of time without requiring resharpening. Normally this axial clearance should not exceed 0.020 inch; however, an axial clearance of as much as 0.050 inch can be tolerated in some instances.

With the reamer constructed in accordance with the present invention the axially extending cutting edges can be ground parallel to the axis of the tool as distinguished from conventional reamers wherein the longitudinally extending edges are ground with a slight back taper in order to provide clearance with the cylindrical surface being machined. With a reamer constructed in accordance with the present invention the guide edges or surfaces do not interfere with the cutting action until the cutting edges on the reamer wear to the extent indicated by the broken line 112 in FIG. 6. However, even if the cutting edges at the leading end of the reamer tend to cut a hole which is slightly undersize due to wear, no serious problems are encountered because the guide surfaces or edges are spaced circumferentially from and behind the cutting edges. In view of this circumferential spacing the side wall of the hole being machined is capable of flexing radially a slight extent between the cutting edge and the guide edge or surface. This circumferential spacing is also important in the event that one or more of the cutting edges is ground undersize either intentionally or otherwise. If the workpiece being machined is of a relatively heavy section so that the side wall of the hole being machined is not capable of flexing radially to any extent, then the guide insert on the reamer shell is located so that it is not solidly backed up in a radial direction by the arbor in order to enable the shell itself to flex radially in the area of the guide insert. For example, in FIGS. 1 and 4 the tapered seats 16 and splines 18 can be made narrower in a circumferential direction so that there is a radial clearance between the arbor and the shell at the portions thereof radially aligned with the guide inserts. Such an arrangement is shown in FIG. 12 which will be described hereinafter.

In FIGS. 7 through 11 the invention is shown applied to a boring tool. The boring tool shown in FIGS. 7 and 8 includes a cylindrical shank 116 which is formed with a plurality of radially extending recesses 118 at the leading end thereof. Within each recess 118 there is secured as by a screw 120 or other suitable means an insert 122. Each insert 122 is of generally circular shape and is ground with a peripheral cutting edge 124 at the front face thereof. The rear or trailing face of each insert is ground with a peripheral guide edge 126 which, as shown, is ground to the same hole diameter as the cutting edge 124. Cutting edges 124 and guide edges 126 extend around the periphery of each insert 122 and function in substantially the same manner as the cutting edges and guide surface or edges of the reamers previously described. However, inserts 122 are rotatably indexable so that when one portion thereof becomes worn each insert can be rotated slightly to present a new cutting edge and a new guide edge. After the cutting edges have become worn around substantially the entire periphery of the inserts, the inserts can be thrown away and replaced with new inserts.

It will be appreciated that while the guide surface in the form of a cylindrical land such as shown in FIGS. 1, 2 and 5a provides a maximum bearing surface for imparting radial stability to the tool, nevertheless under some circumstances it may be desirable to provide the guide member with a relatively sharp guiding edge such as shown in FIGS. 4, 5b and 8. When the guide is formed with a sharp guiding edge, the guiding edge tends to wear at the same rate as the cutting edge and thus tends to minimize the flexing required in either the tool or the workpiece to compensate for wearing of the cutting edge.

In the form of boring tool illustrated in FIGS. 9 through 11 the shank or arbor 127 is provided with a cylindrical extension 128 of reduced diameter. A hardened metal sleeve 130 is retained on extension 128 by a clamp screw 132. A rotary driving connection between arbor 127 and sleeve 130 is provided by one or more keys 134. Sleeve 130 is fashioned with a plurality of axially extending recesses 136 around the outer periphery thereof. Within each recess there is arranged a cartridge 138. At its forward end each cartridge 138 is fashioned with a generally rectangularly shaped socket 140. Within each socket there is arranged a pair of carbide inserts 142, 144. Insert 142 is formed with four cutting edges 146 around its outer periphery on the leading face thereof and insert 144 is formed with four guide edges 148 around the outer periphery of its trailing face. Inserts 142,144 are retained in sockets 140 by a draw bar 150 which interconnects with the inserts by means of a stud 152 having rounded ends and extending through registering holes in inserts 142,144 and draw bar 150. Draw bar 150 extends in an inclined direction through a hole 154 in cartridge 138 and is adapted to firmly seat the inserts in socket 140 by a set screw 156 engaging a shoulder 158 in a draw bar.

Each cartridge 138 is adapted to be adjusted axially within its respective recess 136 by a plurality of adjusting screws 160. After a cartridge is axially adjusted as desired on sleeve 130 it is adapted to be clamped in position by a locking screw 162 and one or more set screws 164.

The reamer illustrated in FIGS. 12 and 13 includes an arbor 166 and an outer shell 168. Arbor 166 has a plurality of circumferentially spaced axially extending seats 170 which taper inwardly in a direction away from the leading end of the reamer. Shell 168 has correspondingly tapered splines 172 around the inner periphery thereof. Adjacent the trailing side of each tapered seat 170 arbor 166 is provided with a radially outwardly extending driving shoulder 174 of uniform diameter in an axial direction. The radially outer surfaces of driving shoulders 174 are threaded as at 176 to receive a shell back-up nut 178. On the forward side of each tapered seat 170 the arbor is fashioned with a radially inwardly extending axial groove 180 so that the shell can be assembled with the arbor by aligning splines 172 with groove 180 to telescopically engage the shell with the arbor and the shell is thereafter rotated relative to the arbor and advanced axially to interengage the inner face of the tapered splines 172 with the tapered seats 170. Thereafter nut 178 can be advanced on thread 176 to prevent the shell from shifting rearwardly on the arbor. The shell is originally expanded to a size larger than the desired hole diameter and thereafter ground to the desired size.

Shell 168 is fashioned with a plurality of radially outwardly extending ribs 182 around the periphery thereof. On each rib 182 there is secured in a suitable manner a cutting insert 184 and a guide insert 186. Inserts 184,186 can be formed similarly to the inserts shown in FIGS. 1, 2 and 4. Between each set of inserts 184,186 rib 182 is provided with a plurality of radially extending lubricant passageways 188. At the radially inner ends thereof passageways 188 communicate with the clearance space 190 between the inner periphery of shell 168 and the threaded segments 176. The arbor is formed with a central lubricant passageway 192 and a plurality of radial passageways 194 which communicate at their outer ends with the grooves 180. Central passageway 192 is plugged at the front end of the reamer by a screw 196 which retains an end plate 198 on the end of the reamer. Plate 198 seals the forward ends of grooves 180 and the clearance spaces 190 between the inner periphery of the shell and the threaded sections 176. Thus with the reamer shown in FIGS. 12 and 13 the lubricant or coolant can be conducted through passageway 192 and then through radial passageways 194 so that it can flow radially outward of the reamer in the recess or groove between each cutting insert 184 and its associated guide insert 186. Coolant will also flow through holes 199 which are drilled through the shell wall to direct coolant to the cutting inserts 184.

In each of the forms of the invention illustrated the cutting edges are backed off to a substantially sharp edge. While the radial clearance faces illustrated in the drawings are generally flat, it will be appreciated that these faces can be backed off with a slight curvature if desired as long as they are backed off radially inwardly from the cutting edges. Regardless of whether these clearance faces are perfectly flat or arcuate, any land directly behind the cutting edge is only of very minimum width such as required to prevent grinding of the cutting edges to a diameter less than desired. The guide edges or surfaces on each of the tools illustrated are spaced circumferentially behind the cutting edges so as to provide a groove therebetween which not only permits flexing of the side wall of the hole being cut or the reamer itself but also facilitates the conducting of coolant or cutting fluid to the space between the cutting edges and its guiding surface. As indicated by the embodiments illustrated, the cutting edges and the guide surfaces may be formed on a solid arbor or may be fashioned on inserts mounted on an expandable shell. The inserts in any event may be on the non-adjustable type or may be of the indexable or throw-away type.

In the tools illustrated a guide edge or surface is shown associated with each cutting edge. While this is the preferred arrangement, it is obviously not essential. The number of guides may be more or less than the number of cutting edges since the primary function of the guides is to stabilize the tool radially. It is important, however, that the guides extend to closely adjacent the leading end of the tool where a major portion of the cutting action occurs. As pointed out above, an axial clearance between the radial cutting edges or the ends of the axial cutting edges at the leading end of the tool and the forward ends of the guides as small as 0.005 to 0.010 inch is satisfactory but this clearance should not exceed about 0.050 inch.

It will likewise be apparent that although in the embodiments illustrated and described the guide inserts or guide edges extend the full length of the cutting edges this is not essential since, as pointed out above, a major portion of the cutting action occurs at the leading end of the tool. Since the primary function of the guides is to stabilize the tool radially, it is important that the guides be provided where the major portion of the cutting action occurs.

In most instances the guide surfaces will be ground to the same diameter as the cutting edges. On the other hand, if in some particular application a preloading is required or desired, the guide surfaces or edges can be ground to a diameter a few ten thousandths of an inch larger than the diameter of the cutting edges.

It will be appreciated that in most instances of reaming and boring the cutting tool is rotated and fed into the work. In some instances the work is rotated. When reference is made herein to a rotary cutting tool it is intended to refer to a cutting tool wherein the work and/or the tool are relatively rotated during a cutting operation.

I claim:

1. A rotary cutting tool, such as a reamer or boring tool, for machining the inner cylindrical surface of a hole in a workpiece by relatively rotating the tool and workpiece by relatively advancing the tool axially into the hole, said tool having an arbor provided with a plurality of teeth spaced circumferentially around the axis of the arbor and extending to the leading end thereof, said teeth having cutting edges which extend axially of the tool at the periphery thereof and which also extend radially of the tool at the leading end thereof, each of said axially extending cutting edges being defined by a front rake face and a radially outer clearance face, said clearance face being backed off radially inwardly at its leading edge substantially at the radially outer edge fo said rake face, at least a plurality of said cutting edges having guide members associated therewith, said guide members each having a radially outer noncutting guide portion spaced radially from the axis of the tool substantially the same distance as said cutting edges, said guide portions being spaced circumferentially behind their respective cutting edges, there being a radially inwardly extending groove between each cutting edge and its respective guide portion, said guide portions extending axially of the tool and terminating adjacent the leading end of the tool short of said radial cutting edges a distance no greater than about 0.050 inch, said arbor having a plurality of circumferentially spaced recesses around the periphery thereof, wear resistant inserts secured in said recesses, said cutting edges and said guide portions being formed on the radially outer ends of said inserts, each insert having a leading end and a trailing end with a radially inwardly extending recess therebetween, the cutting edges being formed on the leading ends of each insert and the guide portions being formed on the trailing end of each insert, said recess defining said groove.

2. A rotary cutting tool as called for in claim 1 wherein each guide portion comprises a cylindrical land struck about the axis of the arbor.

3. A rotary cutting tool as called for in claim 1 wherein each guide portion comprises a radially outermost sharp edge on the guide member defined by the intersection of two generally flat surfaces.

4. A rotary cutting tool, such as a reamer or boring tool, for machining the inner cylindrical surface of a hole in a workpiece by relatively rotating the tool and workpiece and relatively advancing the tool axially into the hole, said tool having an arbor provided with a plurality of teeth spaced circumferentially around the axis of the arbor and extending to the leading end thereof, said teeth having cutting edges which extend axially of the tool at the periphery thereof and which also extend radially of the tool at the leading end thereof, each of said axially extending cutting edges being defined by a front rake face and a radially outer clearance face, said clearance face being backed off radially inwardly at its leading edge substantially at the radially outer edge of said rake face, at least a plurality of said cutting edges having guide members associated therewith, said guide members each having a radially outer noncutting guide portion spaced radially from the axis of the tool substantially the same distance as said cutting edges, said guide portions being spaced circumferentially behind their respective cutting edges, there being a radially inwardly extending groove between each cutting edge and its respective guide portion, said guide portions extending axially of the tool and terminating adjacent the leading end of the tool short of said radial cutting edges a distance no greater than about 0.050 inch, and a sleeve telescopically mounted on said arbor adjacent the leading end thereof, said cutting edges and guide portions being located around the outer periphery of said sleeve, the telescopically engaged portions of the sleeve and arbor having axially tapered surface portions which are interengaged so that when the sleeve and arbor are telescopically engaged and the sleeve is displaced axially in one direction relative to the arbor the sleeve is expanded and the radial dimensions of said cutting edges and guide portions are increased.

5. A rotary cutting tool as called for in claim 4 wherein said axially tapered surface portions of the arbor and sleeve are radially aligned with said cutting edges and guide portions.

6. A rotary cutting tool as called for in claim 4 wherein said axially tapered surface portions of said arbor and sleeve are radially aligned with said cutting edges and are circumferentially off set relative to said guide portions.

7. A rotary cutting tool as called for in claim 6 wherein the portions of said arbor and sleeve radially aligned with said guide surfaces are spaced apart radially.

8. A rotary cutting tool, such as a reamer or boring tool, for machining the inner cylindrical surface of a hole in a workpiece by relatively rotating the tool and workpiece and relatively advancing the tool axially into the hole, said tool having an arbor provided with a plurality of teeth spaced circumferentially around the axis of the arbor and extending to the leading end thereof, said teeth having cutting edges which extend axially of the tool at the periphery thereof and which also extend radially of the tool at the leading end thereof, each of said axially extending cutting edges being defined by a front rake face and a radially outer clearance face, said clearance face being backed off radially inwardly at its leading edge substantially at the radially outer edge of said rake face, at least a plurality of said cutting edges having guide members associated therewith, said guide members each having a radially outer noncutting guide portion spaced radially from the axis of the tool substantially the same distance as said cutting edges, said guide portions being spaced circumferentially behind their respective cutting edges, there being a radially inwardly extending groove between each cutting edge and its respective guide portions, said guide portions extending axially of the tool and terminating adjacent the leading end of the tool short of said radial cutting edges a distance no greater than about 0.050 inch, said arbor having a plurality of circumferentially spaced recesses around the periphery thereof, wear resistant inserts secured in said recesses, said cutting edges and said guide portions being formed on the radially outer ends of said inserts, each insert being shaped as a regular polygon, said cutting edges and guide portions being formed around the outer periphery thereof and means indexably supporting the inserts in said recesses.

9. A rotary cutting tool, such as a reamer or boring tool, for machining the inner cylindrical surface of a hole in a workpiece by relatively rotating the tool and workpiece and relatively advancing the tool axially into the hole, said tool having an arbor provided with a plurality of teeth spaced circumferentially around the axis of the arbor and extending to the leading end thereof, said teeth having cutting edges which extend axially of the tool at the periphery thereof and which also extend radially of the tool at the leading end thereof, each of said axially extending cutting edges being defined by a front rake face and a radially outer clearance face, said clearance face being backed off radially inwardly at its leading edge starting substantially at the radially outer edge of said rake face, said front rake face intersecting the clearance face in a sharp cutting, edge, said clearance face receding radially inwardly substantially directly from said cutting edge, at least a plurality of said cutting edges having guide members associated therewith, said guide members each having a radially outer non-cutting guide portion spaced radially from the axis of the tool substantially the same distance as said cutting edges, said guide portions being spaced circumferentially behind their respective cutting edges, there being a radially inwardly extending groove between each cutting edge and its respective guide portion, said guide portions extending axially of the tool and terminating adjacent the leading end of the tool short of said radial cutting edges a distance no greater than about 0.050 inch, each guide portion comprising a radially outermost sharp edge on the guide member defined by the intersection of two generally inclined flat faces.

* * * * *